United States Patent
Wang et al.

(10) Patent No.: US 8,498,111 B2
(45) Date of Patent: Jul. 30, 2013

(54) NOTEBOOK COMPUTER

(75) Inventors: Hai-Li Wang, Shenzhen (CN); Yong-Qian Deng, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 290 days.

(21) Appl. No.: 12/981,547

(22) Filed: Dec. 30, 2010

(65) Prior Publication Data
US 2012/0147555 A1    Jun. 14, 2012

(30) Foreign Application Priority Data
Dec. 9, 2010  (CN) .......................... 2010 1 0580846

(51) Int. Cl.
*G06F 1/16*     (2006.01)

(52) U.S. Cl.
USPC .................. 361/679.55; 700/110; 455/456.2; 362/85

(58) Field of Classification Search
USPC .... 700/86, 275, 300, 103, 110, 114; 455/566, 455/41.2, 456.2, 411, 556.2, 73; 361/679.02, 361/679.08, 679.55, 679.31, 679.21, 679.41, 361/679.56; 84/713; 327/109, 24, 36; 362/85
See application file for complete search history.

(56) References Cited

U.S. PATENT DOCUMENTS

| | | | |
|---|---|---|---|
| 4,216,692 A | * | 8/1980 | Okuyama et al. ............... 84/713 |
| 2011/0018592 A1 | * | 1/2011 | Kimura et al. ................. 327/109 |
| 2012/0051029 A1 | * | 3/2012 | Huang et al. .................... 362/85 |

* cited by examiner

*Primary Examiner* — Hung Duong
(74) *Attorney, Agent, or Firm* — Altis Law Group, Inc.

(57) ABSTRACT

A notebook computer includes a keyboard circuit, a USB circuit, a switching circuit, a reset circuit, and a lock button. The reset circuit is connected to ground by the lock button, thereby forming a first loop. The loop is switchable between an on-state and an off-state by the lock button.

4 Claims, 2 Drawing Sheets

NOTEBOOK COMPUTER

BACKGROUND

1. Technical Field

The present disclosure generally relates to notebook computers, and particularly to a notebook computer with button locking function.

2. Description of Related Art

Nowadays, notebook computers are extensively used in various environments due to their portable properties. More and more users use notebook computers at home to view web pages, speculate in the stock market, and watch TV or movies. Accidental pushing of buttons may occur such as when there are kids at home, and they push buttons on a notebook out of curiosity, possibly causing data loss.

Therefore, what is needed is to provide a notebook computer with a button locking function.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the disclosure.

DETAILED DESCRIPTION

Reference will now be made to the drawings to describe the present notebook computer in detail.

Figure 1:
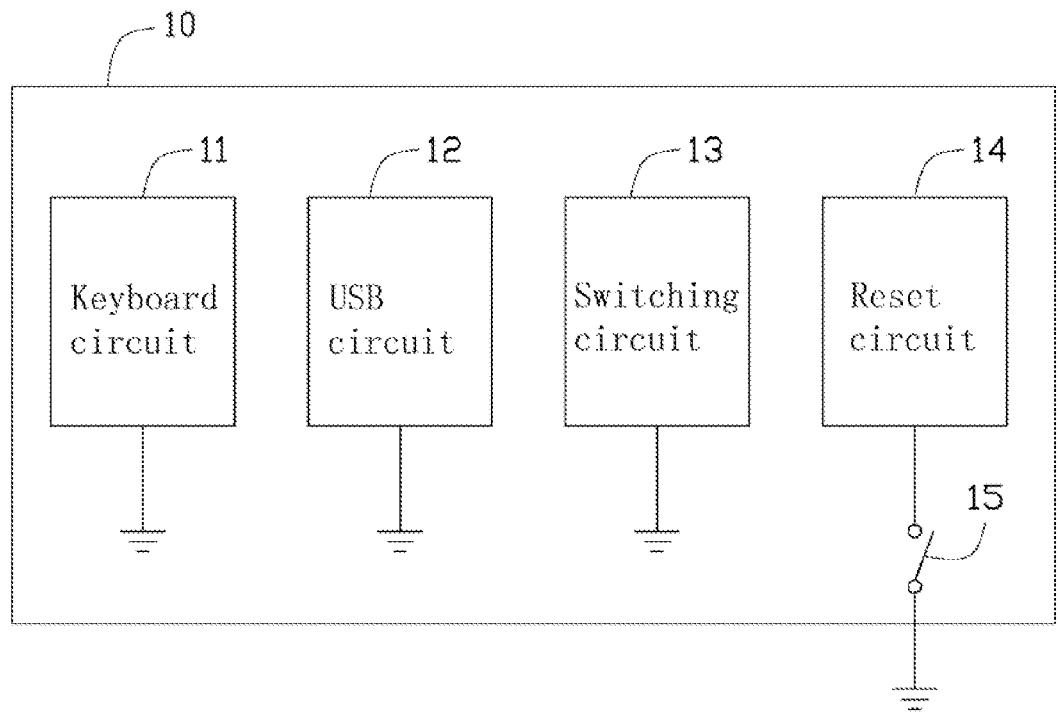
FIG. 1 is a block diagram of a notebook computer in accordance with an exemplary embodiment of the present disclosure.

Referring to FIG. 1, a notebook computer 10 according to an exemplary embodiment includes a keyboard circuit 11, a universal serial bus (USB) circuit 12, a switching circuit 13, a reset circuit 14, and a lock button 15.

The keyboard circuit 11 is equipped with a keyboard, thereby acting as an input device.

The USB circuit 12 is equipped with USB connectors, thereby constituting USB ports, such as USB 1.0, USB 2.0 and USB 3.0.

The switching circuit 13 is equipped with a power button (not illustrated) for turning the computer 10 on and off.

The reset circuit 14 is equipped with a reset button (not illustrated) to perform a resetting function. When the reset button is pressed, the reset circuit 14 resets the notebook computer 10 accordingly.

The lock button 15 is connected between the reset circuit 14 and ground, therefore the reset circuit 14, the lock button 15, and ground cooperatively forming a loop. The lock button 15 is configured for controlling and switching the loop open/close.

When the lock button 15 is closed, the reset circuit 14 is enabled, and the computer 10 can be reset when the reset button is pressed.

When the lock button 15 is opened, the reset circuit 14 is disabled, and the notebook computer 10 will not reset when the reset button is pressed.

As such, the loop formed by the reset circuit 14, the lock button 15, and ground can be selectively opened and closed by the lock button 15. During times when a user does not want the computer 10 to be able to reset, the lock button 15 can be set open, disabling the reset button of the reset circuit 14, and thereby avoiding unexpected data loss.

Figure 2:
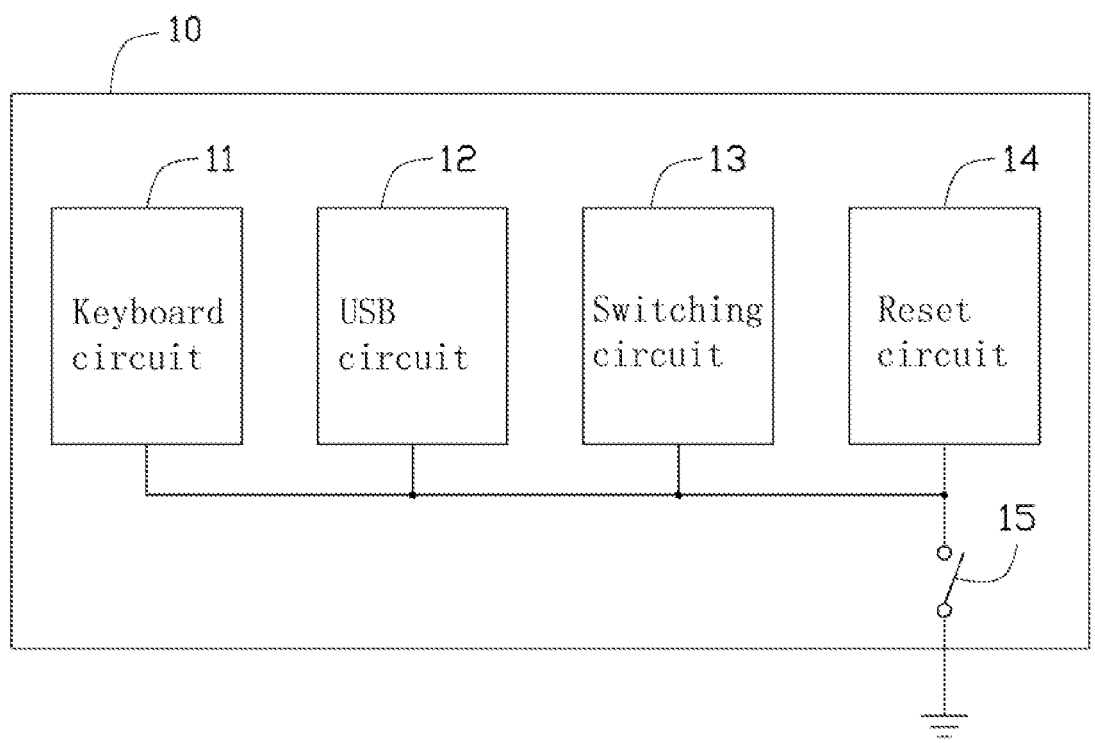
FIG. 2 is a block diagram of a notebook computer in accordance with an alternative embodiment of the present disclosure.

Referring to FIG. 2, the keyboard circuit 11, the USB circuit 12, and the switching circuit 13 can also be connected to ground by the lock button 15, thereby a user can enable or disable those circuits as desired as well.

It is to be understood that the above-described embodiments are intended to illustrate rather than limit the disclosure. Variations may be made to the embodiments without departing from the spirit of the disclosure as claimed. The above-described embodiments illustrate the scope of the disclosure but do not restrict the scope of the disclosure.

What is claimed is:

1. A notebook computer comprising:
a keyboard circuit, a USB circuit, a switching circuit, a reset circuit and a lock button;
wherein the reset circuit is connected to ground by the lock button thereby forming a first loop, and the first loop is switchable between an on-state and an off-state by the lock button;
when the first loop is in the on-state, the notebook computer is resettable; and
when the first loop is in the off-state, the resetting capability of the notebook computer is disabled such that the notebook computer is not able to reset via pressing a button equipped with the reset circuit.

2. The notebook computer according to claim 1, wherein the keyboard circuit is connected to ground by the lock button thereby forming a second loop, and the second loop is switchable between the on-state and the off-state by the lock button; when the second loop is in the on-state, a date can be inputted to the notebook computer by operation of a keyboard; and when the second loop is in the off-state, the date inputting capability of the notebook computer is disabled such that the date can not be inputted to the notebook computer by operation of the keyboard.

3. The notebook computer according to claim 2, wherein the USB circuit is connected to ground by the lock button thereby forming a third loop, and the third loop is switchable between the on-state and the off-state by the lock button; when the third loop is in the on-state, a USB device can be mechanically and electrically connected to the notebook computer by a USB connector equipped with the USB circuit; and when the third loop is in the off-state and the USB device is mechanically connected to the notebook computer by the USB connector, the USB device is electrically disconnected from the notebook computer.

4. The notebook computer according to claim 3, wherein the switching circuit is connected to ground by the lock button thereby forming a fourth loop, and the fourth loop is switchable between the on-state and the off-state by the lock button; when the fourth loop is in the on-state, the notebook computer can be turned on or turned off by operation of a power button equipped with the switching circuit; and when the fourth loop is in the off-state and the power button is operated, the notebook computer can not be turned on or turned off.

* * * * *